Aug. 18, 1931.  J. WILLIAMS  1,819,582
PISTON RING
Filed March 10, 1930
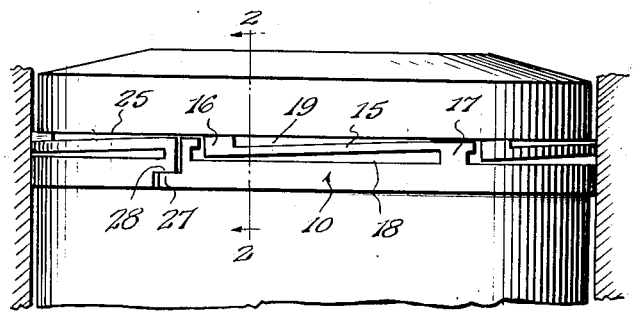
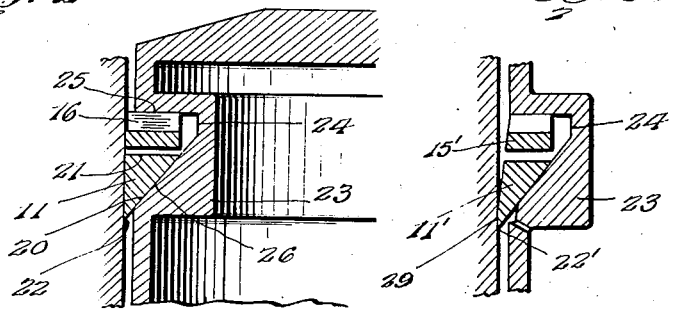
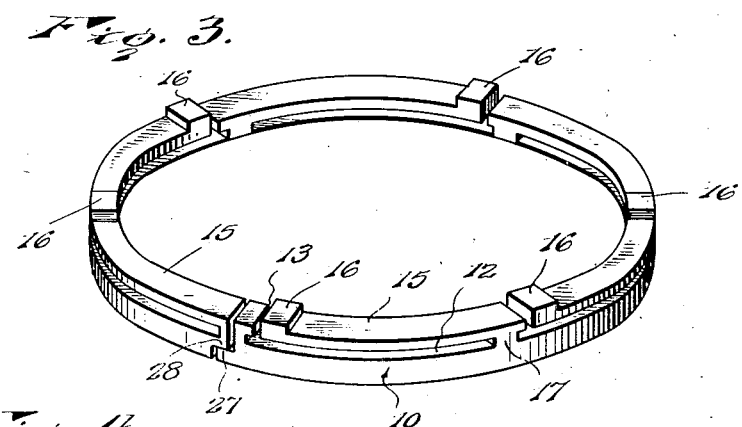
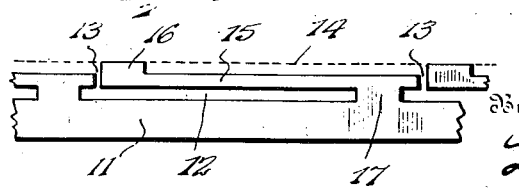
Inventor
John Williams.
By Lacey & Lacey,
Attorneys Patented Aug. 18, 1931

1,819,582

UNITED STATES PATENT OFFICE

JOHN WILLIAMS, OF PHILADELPHIA, PENNSYLVANIA

PISTON RING

Application filed March 10, 1930. Serial No. 434,716.

This invention relates to piston rings of the general type described in my application filed of even date herewith.

An object of the present invention is to provide a piston ring of this type which during manufacture will not require heating so that accidental distortion of the ring with consequent later machining to true up the ring, will be eliminated.

A further object of the invention is to provide a piston ring of this type wherein the formation of the spring tongues will be accomplished without the use of wedges or other distorting means so that the ring will be produced without being distorted at any stage of manufacture.

A still further object is to provide a piston ring having spring tongues fabricated from the body of the ring and of such shape that oil drainage spaces or grooves will be formed above and below the tongues when applied to the ring groove in the piston.

A still further object is to provide a piston ring having spring tongues terminally equipped with upwardly projecting bosses which provide non-scoring contacts at spaced points around the ring with the top wall of the piston groove and thus reduce wear on the parts to a minimum.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a portion of a piston having thereon a piston ring constructed in accordance with my invention, Figure 2 is a fragmentary sectional view of the piston ring embodying my improvements and taken on the line 2—2 of Figure 1, Figure 3 is a perspective view of my improved ring, Figure 4 is an enlarged fragmentary elevation of the ring showing by dotted lines how the bosses are produced.

Figure 5 is a fragmentary sectional view of an oil ring constructed in accordance with my invention.

Referring now to the drawings in which like characters of reference designate similar parts, a piston ring is designated in general by the numeral 10. The ring is preferably formed of cast iron and includes a body portion 11, there being a series of horizontal slots 12 formed near the upper edge of the body portion. These slots are aligned and form oil grooves the purpose of which will presently appear. Vertical slots 13 are cut through the upper edge of the ring and communicate with the slots 12 near the ends thereof.

By referring now to Figure 4 it will be seen that the material at the edge of the ring, overlying each slot 12, as indicated by dotted lines 14, is cut away from each vertical slot 13 to a point contiguous to the next adjacent slot 13, the purpose of this being to produce a spring tongue 15 having at the free end an upwardly extending boss 16, and joined by a web 17 to the body of the ring.

Attention will be particularly called to the fact that during the method of manufacture above described, an integral, unitary, one-piece ring is produced having spring tongues which can yield into the slots 12 when the ring is applied to the piston groove as will be presently described. It will be noted that no distortion of the tongues 15 by heating, insertion of wedges or other devices to disturb the initial position of the tongues, is employed. As a result, the true dimensions of the parts are maintained accurately throughout the various steps of manufacture and the objectionable warping and weakening of the ring as hitherto manufactured is entirely eliminated.

It will be further observed that by virtue of the spring tongues 15 being formed by slotting the body of the ring circumferentially as shown at 12 and by cutting away the material above the slot as shown at 14, oil drainage grooves 18 and 19 will be produced above and below the tongues as best shown in Figure 1 when the ring is applied to the piston. The upper groove 19 furthermore is of greatest magnitude adjacent the boss of the tongue and diminishes to practically nothing adjacent the web of the tongue. The lower groove 18, however, is just the reverse, that is, it is of greatest magnitude at the web of the tongue and diminishes to practically nothing at the boss of the tongue. The purpose of this construction is to provide oil drainage grooves of considerable magnitude above and below each tongue for adequately lubricating the cylinder wall.

It will be further observed that the outer edges of the tongues are flush with the outer edge of the body of the ring and the purpose of this construction is to produce wiping contact with the wall of the cylinder along the entire outer edge of each tongue as well as along the circumferential edge of the body of the ring. By virtue of the tongues receiving the oil from the oil grooves 18 and 19 below and above the tongues, the tongues will also have oil wiping contact to prevent excessive wear on the cylinder wall.

By referring to Figure 2 more particularly it will be seen that the lower edge of the body of the ring is beveled as shown at 20, the bevel extending at the upper end substantially to the bottom walls 21 of the slots 12 and at the lower end meeting the circumferential wall of the ring in a feather edge 22. The purpose of this bevel or conical surface is to provide an inclined seat the purpose of which will presently appear.

By again referring to Figure 2 it will be seen that the piston 23 is provided with a ring groove 24 having a horizontal top wall 25 and a beveled bottom wall 26. By virtue of the tapered wall 26 of the ring groove extending substantially to the base edges of the resilient tongues 15, spaces are provided above the body of the ring to receive whatever leakage of the explosion may occur and since the spring tongues hold the conical opposing surfaces or, in other words, the tapered seat 20 of the ring and inclined bottom wall 26 of the piston groove in positive engagement, no leakage will be admitted back of the body of the ring to cause tapered wear on the cylinder wall.

In operation, the top wall 25 of the piston groove engages the bosses 16 on the free ends of the spring tongues and causes compression of the tongues. This pressure is transmitted through the webs 17 to the body of the ring and firmly seats the tapered seat 20 of the ring upon the corresponding tapered wall 26 of the ring groove in the piston. A component of this downward pressure will be exerted radially on the body 11 of the ring and operate to expand the ring and positively seal the combustion chamber without excessive wall pressure.

In the present embodiment of my invention the ring is split as usual in piston ring construction and the split is illustrated as a step split including a tenon 27 and a recess 28 receiving the tenon. It will be observed that the web 17 of one of the resilient tongues 15 of the ring is disposed contiguous to the recess 28. When the ring is seated in the piston groove the tension of said tongue will be exerted downward on the web which, as shown in Figure 3, overlies the recess 28 and will hold the recessed end of the ring pressed firmly down on the tenon and thus prevent vertical displacement of the step split.

It will be further observed that the upwardly projecting bosses on the spring tongues provide non-scoring contacts at equally spaced points around the ring for engagement with the top wall of the piston groove whereby wear is reduced to a minimum and a uniform downward pressure exerted upon the ring when applied to the piston groove to steady the piston and prevent piston slap and oil pumping.

While the compression rings are constructed substantially as above described it is preferable to taper the outer face of the oil ring 11' as best shown in Figure 5. The taper will begin at the upper edge of the body portion of the ring and extend downwardly to nearly the feather edge 22' of the ring whereby a substantially flat annular seat 29 will be disposed at the bottom edge of the ring for wiping contact with the wall of the cylinder. It is well known that no matter how accurately a ring is constructed if it starts to seat from the top oil will pass the ring. The taper or bevel above described on the outer axial face of the ring causes the ring to positively seat at the bottom first and prevent oil passing the ring.

Having thus described the invention, I claim:

1. A piston ring provided with circumferentially aligned horizontal slots and with vertical slots communicating therewith, the material at the edge of the ring being cut away overlying each horizontal slot, said cut away portion extending from each vertical slot to a point contiguous to the next adjacent vertical slot, said slots and cut away portions producing tongues connected to the body of the ring by webs and providing oil drainage spaces above and below the tongues, said ring being formed with a beveled seat extending substantially to the bottoms of the horizontal slots.

2. A piston ring provided with horizontally curved resilient tongues struck from the body of the ring, said tongues being provided with upwardly extending bosses on the free ends thereof, said tongues having outer and inner axial faces flush with the corresponding faces of the body of the ring, said body being beveled to provide a beveled seat.

3. A piston ring comprising a body and horizontally curved resilient tongues struck from the body and forming an integral unitary structure therewith, said tongues terminating on the upper faces at the free ends thereof in bosses adapted to provide non-scoring contact with the piston groove, there being a step split in said ring comprising a tenon and a recess, the secured end of one of said tongues overlying the recess of said step split and operating to hold the same against vertical displacement.

4. A piston ring comprising a body, resilient horizontally extending compression tongues integral with the body and each connected at one end to the body by a web and each terminating at the free end in an upwardly extending boss, the bosses on the tongues being substantially equidistant apart around the body whereby the thrust of the tongues is distributed uniformly downwardly around the body, said body having a beveled lower face forming a seat below the tongues.

5. A piston ring comprising a body, resilient horizontal compression tongues struck from the body, there being aligned circumferential oil grooves between the upper edge of said body and the tongues, there being aligned circumferential oil grooves on the upper faces of the tongues, each tongue having a web at one end integral with said body, each tongue terminating in an upstanding boss at the free end thereof, the boss of each tongue when relieved of tension being disposed above and rearwardly of the web of the adjoining tongue, said body having a beveled seat below the tongues.

6. A piston ring provided with horizontally curved tongues struck from the body of the ring and having the outer axial faces flush with the corresponding face of the body of the ring, said tongues having upstanding bosses at the free ends, said body being beveled to provide a beveled seat below the tongues.

7. A piston ring provided with horizontally curved tongues struck from the body of the ring, said tongues terminating in upwardly extending bosses at the free ends, said body being beveled on the inner face to provide a beveled seat below the tongues, said body having an outer axial tapered face producing a substantially annular seat near the lower edge of said body.

In testimony whereof I affix my signature.

JOHN WILLIAMS. [L. S.]